United States Patent
Dong et al.

(10) Patent No.: US 9,807,387 B2
(45) Date of Patent: Oct. 31, 2017

(54) GRAPHICS PROCESSING UNIT AND GRAPHICS PROCESSING METHOD

(71) Applicant: VIA Alliance Semiconductor Co., Ltd., Shanghai (CN)

(72) Inventors: Meng Dong, Shanghai (CN); Ruiyang Chen, Shanghai (CN); Yonghai Wu, Shanghai (CN); Wei Wang, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 288 days.

(21) Appl. No.: 14/669,156

(22) Filed: Mar. 26, 2015

(65) Prior Publication Data

US 2016/0173871 A1    Jun. 16, 2016

(30) Foreign Application Priority Data

Dec. 11, 2014    (CN) .......................... 2014 1 0765122

(51) Int. Cl.
*H04N 7/12*    (2006.01)
*G06T 17/00*    (2006.01)
(Continued)

(52) U.S. Cl.
CPC ......... *H04N 19/103* (2014.11); *H04N 19/137* (2014.11); *H04N 19/14* (2014.11);
(Continued)

(58) Field of Classification Search
CPC .. H04N 19/103; H04N 19/186; H04N 19/593; H04N 19/43; H04N 19/51; H04N 19/172
See application file for complete search history.

(56) References Cited

U.S. PATENT DOCUMENTS 8,396,122 B1 *    3/2013    Taylor .................. H04N 19/176
                                                    375/240.03
9,491,469 B2 *    11/2016    Sole Rojals ......... H04N 19/196
(Continued)

FOREIGN PATENT DOCUMENTS

| CN | 103475882 | 12/2013 |
| TW | 201442488 | 11/2014 |
| TW | 201445979 | 12/2014 |

OTHER PUBLICATIONS

European Search Report dated Mar. 15, 2016, issued in application No. 15189095.1-1908.
Chinese language office action dated Sep. 13, 2016, issued in application No. TW 104132489.

*Primary Examiner* — Tsion B Owens
(74) *Attorney, Agent, or Firm* — McClure, Qualey & Rodack, LLP

(57) ABSTRACT

A graphics processing unit and method with hardware for parameter setting and providing adaptive video coding. The hardware for parameter setting has a storage device storing a parameter database. The hardware for parameter setting further performs graphic analysis on a video received by the graphics processing unit to extract graphics features, and looks up the matching set of parameters in the parameter database in accordance with the graphics features. Accordingly, video coding hardware within the graphics processing unit performs video coding based on the matching set of parameters.

10 Claims, 5 Drawing Sheets

(51) Int. Cl.
*H04N 19/103* (2014.01)
*H04N 19/172* (2014.01)
*H04N 19/14* (2014.01)
*H04N 19/137* (2014.01)
*H04N 19/142* (2014.01)
*H04N 19/423* (2014.01)
*H04N 19/85* (2014.01)
*H04N 19/186* (2014.01)
*H04N 19/43* (2014.01)
*H04N 19/51* (2014.01)
*H04N 19/593* (2014.01)

(52) U.S. Cl.
CPC ......... *H04N 19/142* (2014.11); *H04N 19/172* (2014.11); *H04N 19/186* (2014.11); *H04N 19/423* (2014.11); *H04N 19/43* (2014.11); *H04N 19/51* (2014.11); *H04N 19/593* (2014.11); *H04N 19/85* (2014.11)

(56) References Cited

U.S. PATENT DOCUMENTS

| | | | |
|---|---|---|---|
| 2003/0174287 A1 | 9/2003 | Mori et al. | |
| 2006/0222078 A1* | 10/2006 | Raveendran | H04N 21/2365 375/240.16 |
| 2011/0310108 A1* | 12/2011 | Shiraki | G06T 1/20 345/520 |
| 2014/0003497 A1* | 1/2014 | Sullivan | H04N 19/70 375/240.03 |
| 2014/0003500 A1* | 1/2014 | Brailovskiy | H04N 19/176 375/240.12 |
| 2015/0016537 A1 | 1/2015 | Karczewicz et al. | |
| 2015/0078444 A1 | 3/2015 | Hunag | |
| 2015/0304668 A1* | 10/2015 | Jacobson | H04N 19/196 375/240.01 |
| 2015/0381988 A1* | 12/2015 | Gu | H04N 19/119 375/240.12 |
| 2016/0007026 A1 | 1/2016 | Dong et al. | |

* cited by examiner

GRAPHICS PROCESSING UNIT AND GRAPHICS PROCESSING METHOD

CROSS REFERENCE TO RELATED APPLICATIONS

This Application claims priority of China Patent Application No. 201410765122.X, filed on Dec. 11, 2014, the entirety of which is incorporated by reference herein.

BACKGROUND OF THE INVENTION

Field of the Invention

The present invention relates to a graphics processing unit and method, and it particularly relates to high-resolution video recording, compression and release technologies like an advanced video coding technology (i.e. H.264), a high efficiency video coding technology (aka HEVC, i.e. H.265) and so on.

Description of the Related Art

High-resolution video recording, compression, and releasing technologies like an advanced video coding technology (i.e. H.264), a high efficiency video coding technology (aka HEVC, i.e. H.265) and so on are generally being used in many applications like those for videoconferencing, video surveillance, consumer electronics, video storage, video-on-demand (VoD) and so on. Generally, a high-resolution video coding and decoding chip is used.

BRIEF SUMMARY OF THE INVENTION

Graphics processing technology with a parameter database for adaptive video coding is introduced in this disclosure.

A graphics processing unit in accordance with an exemplary embodiment of the disclosure comprises hardware for parameter setting and hardware for video coding. The hardware for parameter setting uses a storage unit to store a parameter database, performs a graphic analysis on a video received by the graphics processing unit to extract graphics features, and looks up a set of parameters matching the graphics features in the parameter database. The hardware for video coding encodes the video based on the matching set of parameters.

In another exemplary embodiment, a graphics processing method using the aforementioned hardware for parameter setting and video coding is disclosed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
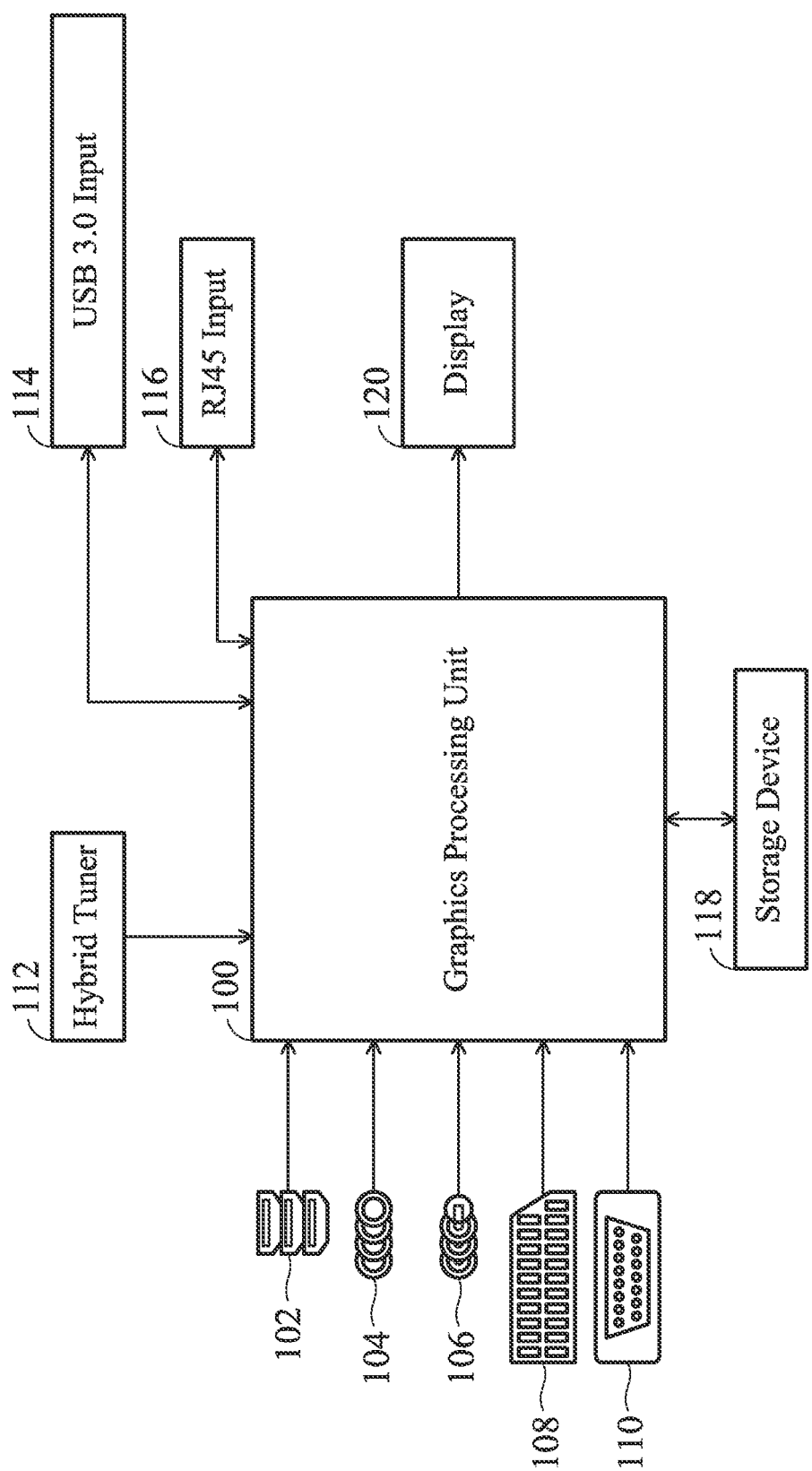
FIG. 1 depicts how a graphics processing unit 100 is used in different applications.

FIG. 1 depicts how a graphics processing unit 100 is used in different applications. The graphics processing unit 100 may be fabricated by a system-on-chip (SOC) technology for advanced video coding (i.e. H.264) or high efficiency video coding (i.e. HEVC/H.265). The graphics processing unit 100 may retrieve video data from a high-definition multimedia interface (HDMI) 102, a YPbPr input 104, a multiple CVBS input 106, an SCART input 108, an RGB input 110, a hybrid tuner 112, an USB 3.0 input 114, an RJ45 input 116 and so on, and store the encoded and compressed video into a storage device 118. The adaptive graphics processing unit 100 may further recover a high-definition video from the compressed video, and display the high-definition video on the display 120.

Figure 2:
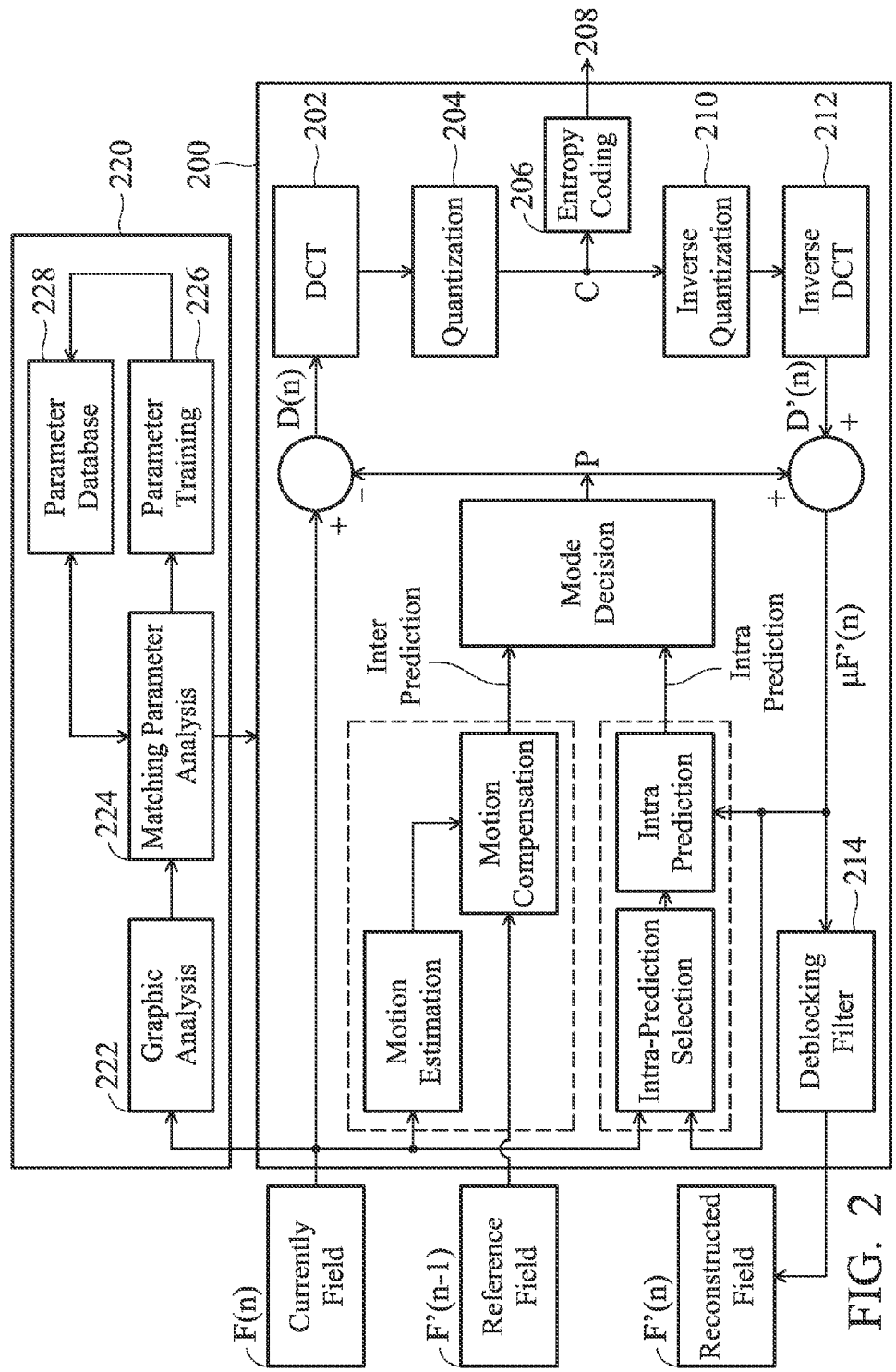
FIG. 2 is a block diagram depicting the internal hardware of the graphics processing unit 100 in accordance with an exemplary embodiment of the disclosure.

FIG. 2 is a block diagram depicting the internal hardware of the graphics processing unit 100 in accordance with an exemplary embodiment of the disclosure, which comprises hardware 200 for video coding and hardware 220 for parameter setting.

First, the hardware 200 for video coding is discussed. There are two types of coding algorithms: intra prediction coding; and inter prediction coding. The intra prediction coding generates predicted pixels P from the pixels within the current field F(n). As for the inter prediction coding, a reconstructed field F'(n−1), also known as a reference field, of the previous field is also taken into account to generate the predicted pixels P. Residual values D(n) are calculated from the difference between the predicted pixels P and the current field F(n). The residual values D(n) are transformed into transform coefficients C by DCT hardware 202 and quantization hardware 204. Then, the transform coefficients C are transformed into a video coding stream 208 by entropy coding hardware 206. Furthermore, the transform coefficients C are further converted by inverse quantization hardware 210 and inverse DCT hardware 212 to generate reconstructed residual values D'(n). The residual values D'(n) are added back to the predicted pixels P to form reconstructed pixels μF'(n). The reconstructed pixels μF'(n) are processed by deblocking filter hardware 214 and thereby a reconstructed field F'(n) is reconstructed as a reference field for the next coding field.

The hardware 200 for video coding encodes a video based on a matching set of parameters that the hardware 220 for parameter setting provides corresponding to the graphics features extracted from the video. The hardware 220 for parameter setting includes hardware 222 for graphic analysis, hardware 224 for matching parameter analysis, hardware 226 for parameter training, and a storage unit 228 storing a parameter database. The hardware 222 for graphic analysis extracts graphics features from a video received by the graphics processing unit 100. Based on the graphics features, the hardware 224 for matching parameter analysis access the storage unit 228 to search the parameter database stored therein. When there is a set of parameters matching the graphics features extracted from the video, the hardware 224 for matching parameter analysis retrieves the set of parameters from the parameter database as a matching set of parameters and, accordingly, drives the hardware 200 for video coding. When the parameter database does not include any set of parameters matching the graphics features extracted from the video, the hardware 226 for parameter training is driven to use a variety of parameter combinations to test the video coding efficiency and thereby to evaluate a matching set of parameters matching the graphics features of the video and store the matching set of parameters into the parameter database. Thus, the matching set of parameters matching the graphics features of the video is available to the matching parameter analysis hardware 224 to drive the hardware 200 for video coding.

The hardware 222 for graphic analysis may analyze color space data, YUV, of images to extract the motion features, complex spatial texture features and so on. Based on the color space data, YUV, an average momentum, $\overline{mv}$, may be evaluated to represent the graphic motion, and a mean average deviation (MAD, an average pixel difference between the original image and the predicted image) may be evaluated to show graphic complexity. In an exemplary embodiment, based on the color space data, YUV, the images may be classified as static and flat images, static and complex images, flat images with slow motion, complex images with slow motion, and flat images with fast motion. The different categories of graphics features correspond to different sets of parameters for video coding.

In addition to the analysis on the color space data (YUV) of a current field, the hardware 222 for graphic analysis may compare the current field with the previous field (e.g. a comparison on the histogram diagrams) for similarity analysis. The similarity analysis is also named I-frame detection, which may be used in scene-change detection. The set of parameters to be used in video coding may depend on scene content.

In an exemplary embodiment, the adaptive parameters include: a frame type, a quantization parameter (abbreviated to QP), a search range, a coding unit size (CUSize), a coding unit depth (CU depth), a discrete cosine transform unit size (THSize, for H.264 applications), a discrete cosine transform unit depth (TU slip depth, for H.264 applications) and so on. The parameter database in the storage unit 228 may use a lookup table to record sets of parameters for categories of graphics features.

For one category of graphics features that has not been matched to any set of parameters stored in the parameter database, the hardware 226 for parameter training may use a variety of parameter combinations to test the video coding efficiency of this category of graphics features and store the set of parameters with the best performance into the parameter database. The video coding efficiency may be evaluated by a PSNR bitrate evaluation that involves a BD-rate (Bjontegaard Distortion rate) management. Sets of parameters with respect to the different categories of graphics features may be stored in the storage unit 228 as a lookup table.

Figure 3A:
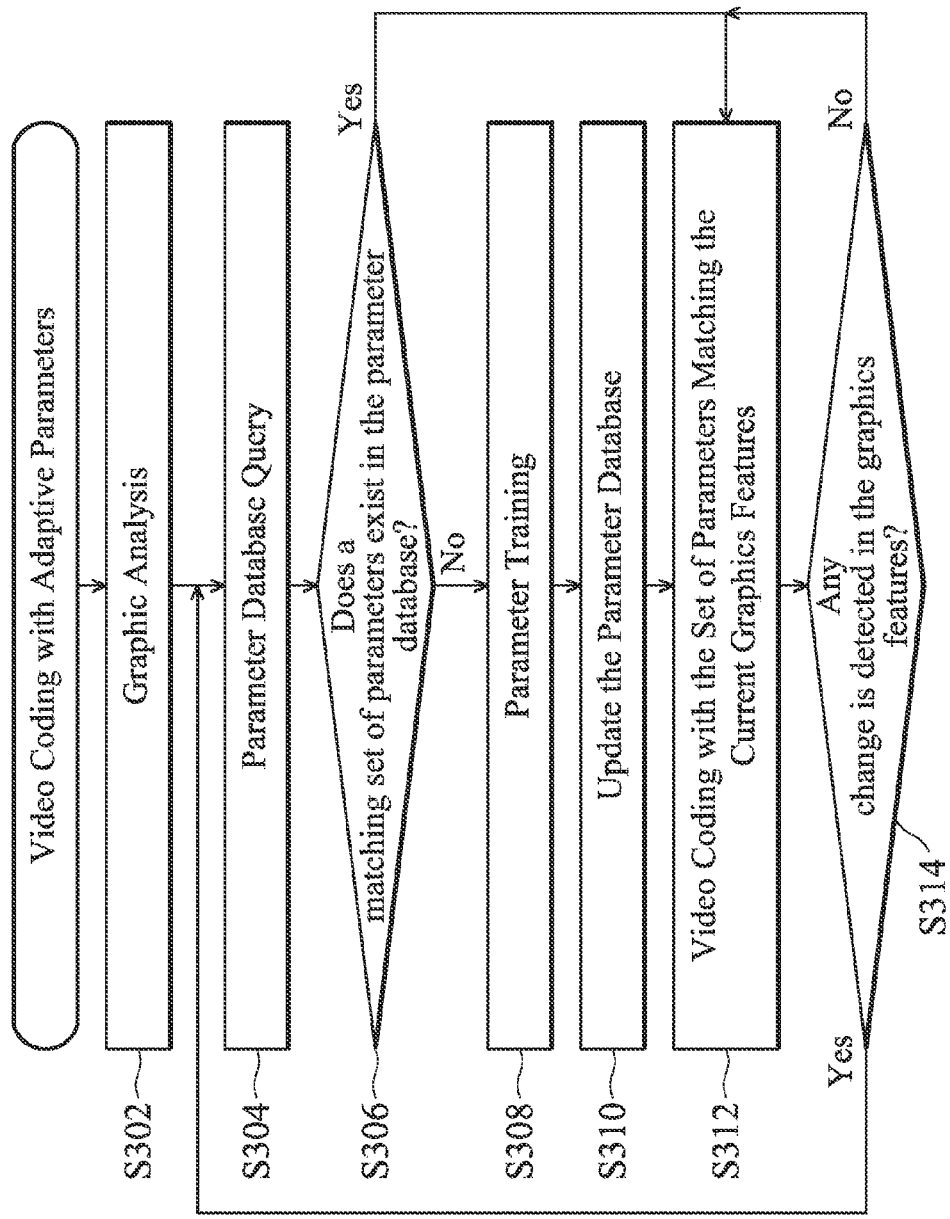
FIG. 3A is a flowchart depicting a graphics processing method with respect to the architecture of FIG. 2, for adaptive video coding.

FIG. 3A is a flowchart depicting a graphics processing method with respect to the architecture of FIG. 2, for adaptive video coding parameters. In step S302, the hardware 222 for graphic analysis extracts graphics features. In step S304, based on the graphics features extracted by the hardware 222, the hardware 224 for matching parameter analysis searches the parameter database of the storage unit 228 for a matching set of parameters corresponding to the graphics features. In step S306, when it is determined that the parameter database in the storage unit 228 does not include any set of parameters matching the current graphics features, step S308 is performed, by which the hardware 226 for parameter training changes the combination of parameters to get the set of parameters matching the current graphics features. In step S310, the set of parameters matching the current graphics features is stored into the storage unit 228 and recorded in the parameter database. In step S312, the video coding hardware 200 executes video coding in accordance with the set of parameters matching the current graphics features. In step S314, it is checked, e.g., by the hardware 222 for graphic analysis, whether the graphics features are changed. When a change is detected in the graphics features, the flow goes back to step S304.

Furthermore, when a matching set of parameters corresponding to the current graphics features is obtained from the parameter database stored in the storage unit 228, steps S308 to S310 are bypassed and step S312 is performed for video coding in accordance with the set of parameters matching the current graphics features.

Figure 3B:
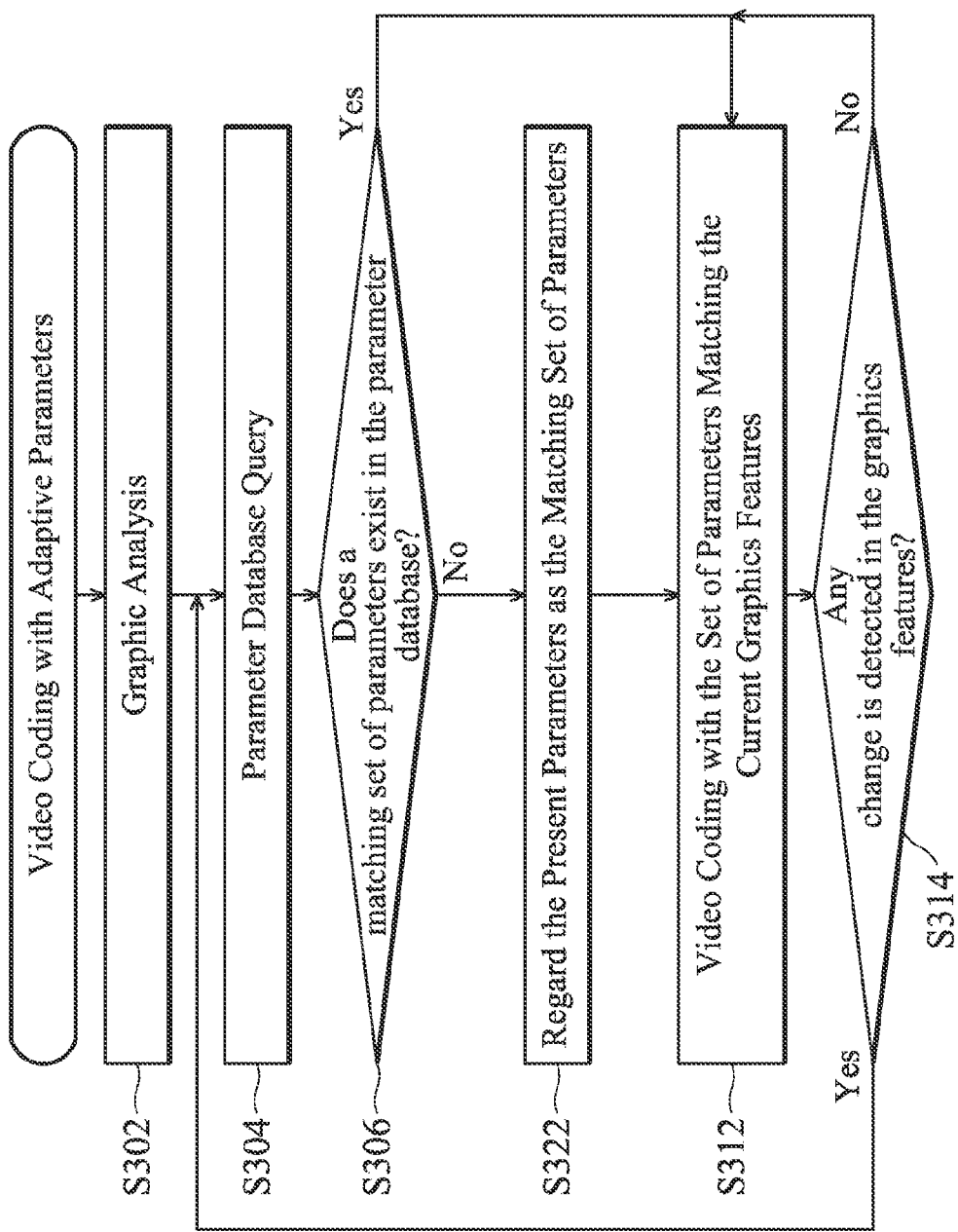
FIG. 3B is a flowchart depicting a graphics processing method in accordance with another exemplary embodiment of the disclosure.

Furthermore, in some exemplary embodiments, the parameter database is not dynamically updated with the user's actions. The hardware 226 for parameter training is implemented in a factory machine rather than being fabricated in the graphics processing unit 100. FIG. 3B is a flowchart depicting a graphics processing method for such a design in accordance with an exemplary embodiment of the disclosure. Unlike the flowchart of FIG. 3A, when it is determined in step S306 that the parameter database in the storage unit 228 does not include any set of parameters matching the current graphics features, step S322 is performed in accordance with the flowchart of FIG. 3B. Step S322 continues using the present parameters and regards the present parameters as the matching set of parameters. Then, in step S312, the video coding hardware 200 executes video coding in accordance with the set of parameters that is regarded as the matching set of parameters.

Figure 4:
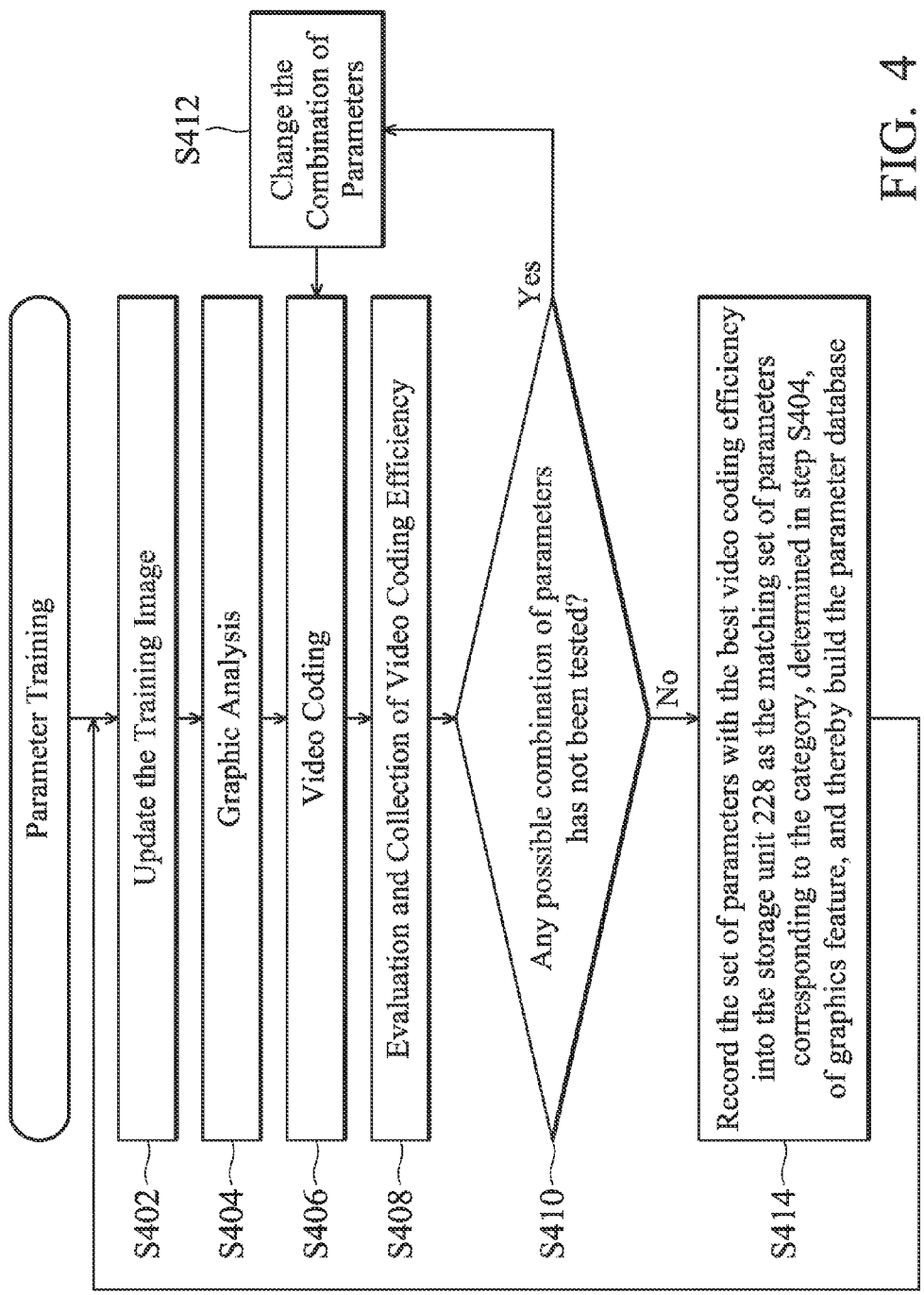
FIG. 4 is a flowchart depicting a parameter training step S308 in accordance with an exemplary embodiment of the disclosure.

FIG. 4 is a flowchart depicting a parameter training step S308 in accordance with an exemplary embodiment of the disclosure. To build a parameter database in the storage unit 228, a training video with a series of training images may be provided to evaluate matching sets of parameters for several categories of graphics features. The update of the training image is performed in step S402. In step S404, a graphic analysis is performed on the training image to analyze the color space data, YUV, to extract the motion features, complex spatial texture features and so on, for graphics classification into the following categories: static and flat images, static and complex images, flat images with slow motion, complex images with slow motion, and flat images with fast motion. Furthermore, in some exemplary embodiments, step S404 further performs I-frame detection for scene-change detection. The analyzed result of step S404 may be used to determine the category of graphics features of the current training image. In step S406, video coding is performed. For example, a default set of parameters is initially used in the video coding of the training image. In step S408, the video coding efficiency is evaluated and collected. In step S410, it is determined whether any possible combination of parameters has not been tested. When there is a possible combination of parameters has not been tested, step S412 is performed to change the combination of parameters and step S406 is repeated to use the changed combination of parameters to execute the video coding. When it is determined in step S410 that there is no other possible combinations of parameters to be tested, step S414 is performed and the set of parameters with the best video coding efficiency is recorded into the storage unit 228 to build the parameter database and regarded as the matching set of parameters corresponding to the category, determined in step S404, of graphics feature.

Any technique using the aforementioned concept in graphics processing is within the scope of the invention. The invention further involves a graphics processing methods, which are not limited to any specific hardware architecture.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics processing unit, comprising:
   hardware for parameter setting, using a storage unit to store a parameter database, performing a graphic analysis on a video received by the graphics processing unit to extract graphics features, and looking up the parameter database in accordance with the graphics features to find a matching set of parameters; and
   hardware for video coding, encoding the video based on the matching set of parameters,
   wherein:
   when not finding any set of parameters in the parameter database matching the graphics features, the hardware for parameter setting uses a variety of parameter combinations to evaluate the matching set of parameters based on video coding efficiency and fills the evaluated matching set of parameters into the parameter database; and
   each set of parameters includes a frame type, a quantization parameter and a search range.

2. The graphics processing unit as claimed in claim 1, wherein:
   the hardware for parameter setting further updates the matching set of parameters with respect to a change in the graphics features of the video.

3. The graphics processing unit as claimed in claim 1, wherein:
   the hardware for parameter setting further extracts motion features and complex spatial texture features from color space data, YUV, of the video received by the graphics processing unit, and consults the parameter database accordingly.

4. The graphics processing unit as claimed in claim 3, wherein:
   the hardware for parameter setting further detects scene changes based on the color space data, YUV, of the video received by the graphics processing unit, and consults the parameter database accordingly.

5. The graphics processing unit as claimed in claim 1, wherein:
   the parameter database uses a lookup table to record multiple sets of parameters; and
   each set of parameters further includes a coding unit size, a coding unit depth, a discrete cosine transform unit size, or a discrete cosine transform unit depth.

6. A graphics processing method, comprising:
   using hardware for parameter setting to provide a storage unit to store a parameter database, and further using the hardware for parameter setting to perform a graphic analysis on a video received by a graphics processing unit to extract graphics features and consulting the parameter database in accordance with the graphics features to find a matching set of parameters; and
   using hardware for video coding to encode the video based on the matching set of parameters,
   wherein:
   when not finding any set of parameters in the parameter database matching the graphics features, the hardware for parameter setting uses a variety of parameter combinations to evaluate the matching set of parameters based on video coding efficiency and fills the evaluated matching set of parameters into the parameter database; and
   each set of parameters includes a frame type, a quantization parameter and a search range.

7. The graphics processing method as claimed in claim 6, further comprising:
   using the hardware for parameter setting to update the matching set of parameters with respect to a change in the graphics features of the video.

8. The graphics processing method as claimed in claim 6, further comprising:
   using the hardware for parameter setting to extract motion features and complex spatial texture features from color space data, YUV, of the video received by the graphics processing unit and consult the parameter database accordingly.

9. The graphics processing method as claimed in claim 8, further comprising:
   using the hardware for parameter setting to detect scene changes based on the color space data, YUV, of the video received by the graphics processing unit and consult the parameter database accordingly.

10. The graphics processing method as claimed in claim 6, further comprising:
    using the parameter database to build a lookup table to record multiple sets of parameters,
    wherein each set of parameters further includes a coding unit size, a coding unit depth, a discrete cosine transform unit size, or a discrete cosine transform unit depth.

* * * * *